United States Patent [19]

Nitzsche et al.

[11] 3,742,004

[45] June 26, 1973

[54] ROOM TEMPERATURE VULCANIZABLE SILICONE RUBBER STOCKS

[75] Inventors: Siegfried Nitzsche; Wolfgang Kaiser; Ernst Wohlfarth; Paul Hittmair, all of Burghausen, Upper Bavaria, Germany

[73] Assignee: Wacker-Chemie G.m.b.H., Munich, Bavaria, Germany

[22] Filed: Jan. 28, 1972

[21] Appl. No.: 221,790

Related U.S. Application Data

[62] Division of Ser. No. 63,608, Aug. 13, 1970, abandoned.

[52] U.S. Cl. 260/448.2 N, 260/46.5 E, 260/448.2 E
[51] Int. Cl. ............................................... C07f 7/10
[58] Field of Search ................. 260/448.2 N, 46.5 E

[56] References Cited
UNITED STATES PATENTS

| | | | |
|---|---|---|---|
| 3,609,178 | 9/1971 | Thomas | 260/46.5 E X |
| 3,189,576 | 6/1965 | Sweet | 260/46.5 E |
| 3,674,738 | 7/1972 | Nitzsche et al. | 260/448.2 N X |
| 3,678,003 | 7/1972 | Kaiser et al. | 260/46.5 E X |

Primary Examiner—Daniel E. Wyman
Assistant Examiner—Paul F. Shaver
Attorney—Robert F. Fleming, Jr. et al.

[57] ABSTRACT

A room-temperature vulcanizable silicone rubber stock is prepared by admixing an essentially linear diorganopolysiloxane having reactive end groups, preferably hydroxyl end groups, and as a crosslinker an organosilicon compound containing both oxime groups bonded to silicon through oxygen atoms and amino groups bonded to silicon through Si—N bonding. These materials can be stored in the absence of moisture and will cure to form elastomeric products upon exposure to moisture. Particularly useful as crosslinking agents are silanes of the general formula $R_aSi(ON=X)_b(NR'R)_c$ wherein R is a monovalent hydrocarbon radical, R' is a monovalent hydrocarbon radical or H, X is RR'C= or

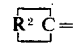

where $R^2$ is a divalent hydrocarbon radical, $a$ is 0 or 1, $b$ and $c$ have an average value of at least 0.5, $b + c$ is 3 or 4 and $a = b + c$ is 4.

2 Claims, No Drawings

ROOM TEMPERATURE VULCANIZABLE SILICONE RUBBER STOCKS

This application is a divisional application based on U.S. Patent application Ser. No. 63,608 filed Aug. 13, 1970, now abandoned which application claimed priority under Title 35, U.S. Code, Section 119, from German Patent Application No. P 19 41 285.2 filed Aug. 13, 1969.

This invention relates to a novel room temperature vulcanizable silicone rubber stock which can be stored in the absence of moisture and cures upon exposure to moisture based particularly on a novel crosslinking organosilicon compound.

Room temperature vulcanizable silicone rubber stocks are well known in the art as RTV silicone rubbers. These materials have been prepared as two general types or systems; namely, one component stocks wherein all the ingredients are combined in a single package which protects the mixture from moisture and the stock cures upon exposure to moisture; and two componet stocks wherein the ingredients are packaged in at least two separate containers and are mixed just prior to use and may not require the presence of moisture for cure. Each system has advantages and the present invention is directed to a new RTV silicone rubber stock which falls into the "one component" category.

In preparing the one component RTV silicone rubber stocks, one generally employs a linear diorganopolysiloxane having reactive end groups, a polyfunctional crosslinking organosilicon material and, optionally, a curing catalyst. This invention introduces a novel polyfunctional crosslinking organosilicon material containing both oxime and amino functionality.

It has been known to prepare one component RTV silicone rubber stocks with linear, hydroxyl endblocked diorganosiloxane polymers and polyfunctional amino substituted silicon compounds or polyfunctional oxime substituted silicon compounds, (see, e.g., German Patent Publication No. 1,120,690, U.S. Pat. Nos. 3,453,307 and 3,189,576). (For the sake of brevity, those one-component RTV silicone rubber systems cured with amino substituted silicon compounds will be called amino one-component systems and those cured with oxime substituted silicon compounds will be called oxime one-component systems.)

The amino and oxime one-component RTV silicone rubber systems exhibit advantages over other one-component RTV systems. One such advantage is that these systems do not produce corrosive materials during cure as do the known acetoxy based systems, for example. Also, offensive odor and slow cure are avoided by the use of the oxime and amino systems.

It is the primary object of this invention to introduce a novel RTV silicone rubber stock. A further object is novel aminooximeorganosilanes and oligomers which are particularly useful as crosslinkers in RTV silicone rubber stocks. Other objects and advantages of this invention are detailed in or will be apparent from the disclosure and claims which follow.

This invention introduces a one-component RTV silicone rubber stock, stable in the absence of moisture consisting essentially of (A) an essentially linear diorganopolysiloxane having chemically reactive endblocking units, and (B) a crosslinking hydrolyzable silicon compound selected from silanes and their oligomers containing in each molecule an average of at least 0.5 oxime groups bonded to silicon through oxygen atoms and at least 0.5 amine groups bonded to silicon through Si-N linkage, each molecule containing a total of at least three oxime and amino groups, any remaining silicon valences being satisfied by monovalent hydrocarbon or substituted hydrocarbon atoms or by oxygen atoms present as siloxane linkages.

The essentially linear diorganopolysiloxanes (A) are well known in the art and are available commercially. The best known and most widely employed of this polymer has hydroxyl endblockers and can be defined by the general formula $(HO)_x(R_ySiO_{4-y/2})_nH$ where R is a hydrocarbyl or substituted hydrocarbyl radical, $x$ has an average value of 0.99 to 1.01, $y$ has an average value of 1.99 to 2.01, $x + y$ is 3.0 and $n$ has a value of at least 3 but more preferably at least 50 and can have a value such that the polymer is gum-like and has a viscosity exceeding 1,000,000 cs. at 25°C. The hydroxyl groups in the above formula can be replaced, totally or partially, with other reactive end groups such as RHN—, oxime groups, silicon bonded hydrogen atoms, alkoxy groups or alkoxyalkoxy groups. The polymers are generally made up of $R_2SiO$ units but small amounts, preferably below 2 mol percent, of $RSiO_{3/2}$, $R_3SiO_{1/2}$ and even $SiO_2$ units can be tolerated. The more nearly the value of $y$ approaches 2.00, the better the ultimate product. The operable polymers are well known and fully described in the prior art as in U.S. Pat. Nos. 3,127,363, 3,082,526, 2,927,907, 2,843,555 and 3,184,427.

The organic substituents represented by R include hydrocarbyl radicals such as alkyl radicals such as methyl, ethyl, isopropyl and octadecyl radicals; alkenyl radicals such as vinyl, allyl and octadecenyl radicals; cycloaliphatic radicals such as cyclopentyl, cyclohexyl, cyclohexenyl and methylcyclohexyl radicals; aryl radicals such as phenyl, xenyl and naphthyl radicals; aralkyl radicals such as benzyl, beta-phenylethyl and beta-phenylpropyl radicals; and alkaryl radicals such as tolyl radicals, propylphenyl radicals and ethylphenyl radicals. R can also be a substituted hydrocarbyl radical such as a halogenohydrocarbyl radical including chloro, fluoro, bromo and iodo substituted derivatives of the above defined and exemplified hydrocarbyl radicals and particularly chlorophenyl, perfluoroalkylethyl such as $CF_3CH_2CH_2$—, perchlorovinyl and chloromethyl as well as cyanoalkyl radicals such as beta-cyanoethyl. It is preferred that at least 50 percent of the R groups be methyl radicals and the remaining R groups, if any, phenyl, vinyl or both.

The R groups on any one silicon atom can be the same or different. The polymers can be homopolymers, copolymers, mixtures of homopolymers or copolymers or both and the degree of polymerization can be over a narrow or wide range. Preferably, the diorganopolysiloxane has a viscosity in the range from 100 to 500,000 cs. at 25°C.

The second ingredient herein is the crosslinking agents (B) which are novel silanes or oligomers of such silanes. The crosslinking agent (B) must contain an average of at least 0.5 oxime groups bonded to silicon through an oxygen atom and an average of at least 0.5 amino groups bonded to silicon through an Si—N linkage and a total of at least 3 of such oxime and amino groups per molecule. The remaining valences of the silicon atoms in such silanes and oligomers can be satisfied by hydrocarbyl or substituted hydrocarbyl radicals as defined for the symbol R and by oxygen atoms present as siloxane linkages (Si—O—Si). The preferred silane crosslinking agents (B) are defined by the general formula $R_aSi(ON=X)_b(NRR')_c$ where R is as above defined, R' is hydrogen or a radical as defined for R, X is $RR^3C=$ or

where R is as above defined and $R^3$ is a hydrogen or a hydrocarbyl or substituted hydrocarbyl radical free of aliphatic unsaturation, and $R^2$ is a divalent hydrocarbon or halogenohydrocarbon radical, $a$ is 0 or 1, $b$ and $c$ each have an average value of at least 0.5, the sum of $b$ and $c$ is 3 or 4 and $a+b+c$ is 4. Preferably, R' is hydrogen, the R radical in the amino group is n-butyl or cyclohexyl. Examples of the divalent $R^2$ group include hydrocarbon radicals and substituted hydrocarbon radicals which form a ring with the carbon atom of the

group and can be exemplified by $-CH_2(CH_2)_4CH_2-$; $-CH_2(CH_2)_4CH_2-$; $-C_6H_4C_6H_4-$; $-CH_2[CH(CH_3)]_2CH_2CH_2-$;

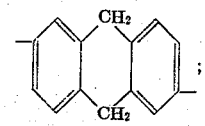

$-CH_2CHCl(CH_2)_3-$; $-C_6H_4C_6H_3Br-$; $-CF_2(CF_2)_3CF_2-$ and $-CH_2CH_2(CH[CCl_3])_2CH_2-$. The substituent group $-ON=X$ is fully described and exemplified in U.S. Pat. Nos. 3,184,427 and 3,189,576, incorporated herein by reference.

As can be seen from the required average value of at least 0.5 for $b$ and $c$, mixtures of various silanes of the above formulae can be employed. Furthermore, oligomers of the defined silanes and mixtures of such silanes and their oligomers, for instance, as they appear upon preparation of such silanes, can be used.

Furthermore, in place of the defined novel silanes which display both amino and oxime groups in each molecule, mixtures of silanes containing only oxime groups with silanes containing only amino groups and oligomers of such silanes can be used. Examples of silanes containing only oxime groups as the hydrolyzable group containing nitrogen are particularly defined by the general formula $R_aSi(ON=X)_{r-a}$ where R, X and $a$ are as above defined. Examples of silanes containing only amino groups as the hydrolyzable group containing nitrogen are particularly defined by the general formula $R_aSi(NRR')_{4-a}$ where R, R' and $a$ are as above defined. Preferably, in both types of silanes $a$ has a value of 1.0. However, it is required that the mixture of silanes have an average of at least 0.5 oxime groups and 0.5 amino groups per silicon atom present and a total average of at least 3 oxime and amino groups per molecule in the mixture.

The silanes of the formulae set out above and employed as crosslinking agents herein can be prepared by reacting a halogenosilane with an oxime of the formula X=NOH, where X is as above defined, a primary or secondary amine of the formula R'RNH, wherein R and R' are as above defined, or mixtures of such oximes and amines. Preferably, the reaction is carried forward in the presence of an acid acceptor such as triethylamine, pyridine or alpha-picoline or a mixture thereof. The reaction is carried forward at room temperature, preferably in an inert solvent such as toluene and under exclusion of water. In short, the procedures and reactions employed to prepare the oxime-aminosilanes employed herein are those known for the reaction of halogenosilanes with oximes and amines individually.

The defined crosslinking agent (B) is employed in proportions such that there is a total of at least 1 mol of the crosslinking agent (B) per gram equivalent of reactive end groups in the diorganopolysiloxane (A). In practice, 0.2 to 15 percent by weight of crosslinker (B), preferably 1 to 10 percent by weight, is present in the mixture of diorganopolysiloxane (A) and crosslinking agent (B). Operable condensation catalysts include those catalysts disclosed in U.S. Pat. Nos. 3,127,363, 2,843,555 and 2,927,907, among others.

In addition to the diorganopolysiloxane (A) and defined crosslinking agent (B), the RTV silicone rubber stocks of this invention can contain fillers and other additives well known for use in such stocks and employed in their standard or known proportions. Such additional materials include reinforcing fillers, non-reinforcing fillers, pigments, soluble dyes, silicone resins, organic resins such as polyvinylchloride powder, corrosion inhibitors, perfumes and other aromatics, oxidation inhibitors, heat stabilizers, solvents, condensation catalysts such as dibutyltindilaurate, dibutyltin-di-2-ethylhexoate and organosiloxytitanium compounds as well as organic titanates, and softeners and plasticizers such as diorganosiloxanes having non-reactive endblockers such as trimethylsiloxy endblocked dimethylpolysiloxanes. If some of the organosilicon compounds and polymers present in the RTV silicone rubber stocks of this invention have aliphatically unsaturated organic substituents such as vinyl, allyl and cyclohexenyl radicals, it is desirable to include 0.01 to 5 percent by weight of an organic peroxide based on the weight of the diorganopolysiloxane present.

It is generally the practice to employ fillers in silicone rubber stocks and operable fillers herein include reinforcing fillers which typically have a surface area of more than 50 square meters per gram and include fume silicas, silica aerogels, precipitated silicas and other high surface area fillers; non-reinforcing fillers having surface areas below 50 square meters per gram and exemplified by quartz flour, diatomaceous earth, calcium silicate, zirconium silicate, the so-called "molecular sieves", calcium carbonate and certain carbon blacks. Also operable are fibrous fillers such as asbestos, glass fibers and organic fibers. The fillers can be pre-treated to display organosiloxy or alkoxy groups on their surface. Mixtures of fillers can be used. In general, the fillers are employed in standard proportions well known in the art with excellent results achieved with 5 to 90 percent filler based on the total weight of organopolysiloxane (A) and filler.

The RTV silicone rubber stocks of this invention can be prepared by any desired means for mixing such stocks but water should be excluded from the ingredients prior to mixing and the mixing should be carried forward in the absence of water vapor.

The RTV silicon rubber stocks of this invention are packaged and stored in the absence of and under exclusion of water in any form. The stocks cure to form elastomeric products at room temperature when exposed to moisture. In general, the moisture present in the atmosphere is sufficient to bring about the desired vulcanization and cure but in areas where water vapor levels in the atmosphere are very low (i.e. very low humidity) or when a more rapid cure is desired, water or water vapor may be introduced by any desired means. Furthermore, the cure rate can be advanced, if desired, by increasing the temperature at which the cure is carried forward.

It should be noted that in contrast to the known aminosilane crosslinking agents, the present system has the advantage that they will cure at temperatures below 5°C. and at relative humidity exceeding 60 percent to produce an elastomer whose surface is smooth and shows no undesired wrinkling or crimping. Further, the systems of this invention are superior to the known oximesilane crosslinking systems in that they adhere better to substrates.

The RTV silicone rubber stocks can be vulcanized and cured in thin film or deep section on a wide variety of substrates and will exhibit excellent adhesion to such substrates even in the absence of primers, although it should be understood such primers can be used if desired and may enhance adhesion. Typical substrates to which such adhesion has been noted include glass, porcelain, stone, concrete, mortar, aluminum, stainless steel, copper, wood, paper, polyvinylchloride, coatings of synthetic resin lacquers, various organic plastic surfaces (both thermoplastics and thermoset plastics), and a wide variety of construction materials. The RTV silicone rubber stocks of this invention are useful in all the wide variety of uses presently known for such stocks including preparation of molds, sealing joints and hollow areas, as adhesives, for putty masses for preparing protective coatings, paper coatings to achieve release or abhesive surfaces, insulation on electrical conductors, as shatter-resistant coatings on glassware and other frangible materials, especially light bulbs, and in preparation of intricate and delicate molds for waxes and similar materials.

The following examples are included herein to assist those skilled in the art to gain a full understanding of the invention. The examples are not intended to define or limit the scope of the invention and the various equivalent materials noted above in this disclosure can be substituted in chemically equivalent amounts in any of the examples with equivalent results being achieved and realized. All parts and percentages are based on weight and all viscosities were measured at 25°C.

The crosslinking agent (B) employed in Examples 1 and 2 was prepared as follows. A solution of 174 grams of methylethylketoxime in 800 ml. of toluene was added dropwise at room temperature, under exclusion of moisture, with concurrent stirring to a solution of 149.5 grams of $CH_3SiCl_3$ and 336 grams triethylamine in 2.3 liters of toluene. After the addition was completed, the reaction mixture was stirred for two hours at room temperature. Then a solution of 115 grams of cyclohexylamine in 400 ml. of toluene was added to the mixture, dropwise, with concurrent stirring at room temperature and with the careful exclusion of moisture from the reaction zone. After the addition of the cyclohexylamine solution was completed, the reaction mixture was stirred for an additional 3 hours at room temperature. The reaction mixture was filtered to remove precipitate and the precipitate was washed with toluene. The toluene which was used to wash the precipitate was combined with the filtrate and the solution thus obtained was stripped by heating at 140°C. at atmospheric pressure and then at 70°C. at 10 mm. Hg. (abs.) pressure. The residue was filtered and 286 g. of filtrate was obtained. The fluid filtrate was analyzed by elemental analysis as well as recognized analytical techniques and proved to be essentially the silane of the formula $CH_3Si[ON=C(CH_3)(C_2H_5)]_2NHC_6H_{11}$.

EXAMPLE 1 a. 100 grams of a mixture of 50 parts hydroxyl end-blocked dimethylpolysiloxane having a viscosity of 50,000 CP/25°C., 20 parts calcium silicate filler and 10 parts fume silica was mixed with 5 grams of the fluid prepared above employed as the crosslinking silane and 0.1 g. dibutyltindilaurate. This mixture was mass A.

b. For purposes of comparison, the procedure described in (a) above was repeated but the crosslinking agent employed was 5 g. of $CH_3Si[ON=C(CH_3)(C_2H_5)]_3$. This mixture was mass B.

The mixtures so prepared (Mass A and Mass B) were stored with moisture excluded and showed no deterioration after several months storage. The masses A and B vulcanized and cured to form elastomers when exposed to atmospheric moisture at room temperature.

The masses A and B were compared as to adhesion to concrete employing tear machines according to the standards set down in "Guides for Testing Joint Materials in Prefabricated Concrete Construction" (issued June, 1967), reprinted in "Beton and Stahlbau", Vol. 62, 1967, No. 9, reprint 2.4.1 and according to test articles stored in accordance with reprint 2.4.2, and adhesive strength of elastomers prepared on other substrates of elastomers prepared on other substrates according to the American Standards Association Method 116.1. The following results were obtained.

Adhesive Strength in Kg./sq. cm.

| Substrata | Cured Polyvinyl chloride | Aluminum | Stainless Steel (V₂A) | Concrete |
|---|---|---|---|---|
| Mass A | 3.5 | 10.1 | 2.5 | 3.0 |
| Mass B | 0 | 1.8 | 0.8 | 1.8 |

EXAMPLE 2 c. A mixture weighing 100 grams was prepared from 32 parts α,ω-dihydroxydimethylpolysiloxane having a viscosity of 80,000 cP/25°C., 15 parts α,ω-dimethyldimethylpolysiloxane having a viscosity of 33 cP/25°C., 45 parts quartz flour and 8 parts fume silica. The foregoing mixture was further mixed with 4 to 5 grams of the silane $CH_3Si[ON=C(CH_3)(C_2H_5)]_2NHC_6H_{11}$ prepared above. This was identified as mass C.

d. For comparison purposes, the procedure set forth under (c) above was repeated but the crosslinking silane employed was 4.5 grams of methyltris(cyclohexylamino)silane. This was identified as mass D.

Mass C cures at 2°C. and 98 percent relative humidity to form an elastomeric product having a smooth, unwrinkled surface but Mass D cured at 2°C. and 92 percent humidity to form a wrinkled, uneven surface.

EXAMPLE 3

The procedure in Example 1(a) was repeated except the crosslinking silane employed was 5 grams of a mixture of 2 mols of $CH_3Si[ON=C(CH_3)(C_2H_5)]_3$ and 1 mol of methyltris(cyclohexylamino)silane. The mixture so obtained could be stored in the absence of moisture and upon exposure to atmospheric moisture it cured to form an elastomeric product. The adhesion of this RTV silicone rubber stock was tested as in Example 1 above with the following results:

Adhesive Strength in Kg./sq. cm

| Substrata | Cured Polyvinyl chloride | Aluminum | Stainless Steel (V₂A) | Concrete |
|---|---|---|---|---|
| | 3.3 | 10.4 | 2.8 | 3.1 |

EXAMPLE 4

Equivalent results were achieved when Example 1(a) was repeated with 5 g. of each of the following silanes or their oligomers:

$(CH_3)_2C=NOSi(NHCH_3)_3$ $[(C_2H_5)_2C=NO]_3Si\ NHC_6H_{11}$ and

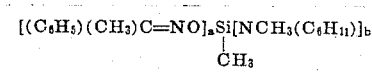

where $a$ is 1 or 2, $b$ is 1 or 2 and $a+b$ is 3.

EXAMPLE 5

Equivalent results are achieved when Example 4 is repeated employing as the base siloxane polymer any of the following:

1. $HO(\underset{\underset{C_6H_5}{|}}{\overset{\overset{CH_3}{|}}{Si}}O)_{20}H$ or 2. $HO[(CH_3)_2SiO]_{35}[(C_6H_5)_2SiO]_5H$.

That which is claimed is:

1. Silanes of the general formula $R_aSi(ON=X)_b(NR'R)_c$ where each R is a monovalent hydrocarbon radical of one to 18 carbon atoms, R' is a hydrogen atom or R radical, a halogenated hydrocarbon radical of one to 18 carbon atoms or a cyanoalkyl radical, X is a radical of the formula $=CRR^3$ or

where R is as above defined, $R^3$ is hydrogen or an R radical, $R^2$ is a divalent hydrocarbon or halogenated hydrocarbon radical, $a$ is 0 or 1, $b$ is 1, 2 or 3, $c$ is 1, 2 or 3, $b+c$ is 3 or 4, and $a+b+c$ is 4.

2. Silanes of the formula $CH_3Si(ON=X)_2(NHC_6H_{11})$, and X is $=C(C_2H_5)_2$, $=C(CH_3)_2$ or $=C(C_2H_5)(CH_3)$.

* * * * *

UNITED STATES PATENT AND TRADEMARK OFFICE
CERTIFICATE OF CORRECTION

PATENT NO. : 3,742,004
DATED : June 26, 1973
INVENTOR(S) : Siegfried Nitzsche, et al It is certified that error appears in the above-identified patent and that said Letters Patent is hereby corrected as shown below:

In the last line of the Abstract, "a = b + c is 4." should read -- a + b + c is 4. --.

In column 1 line 5, after "1970, now" delete "abandoned" and insert -- U.S. Patent No. 3,674,738 --.

In column 1, line 21, "componet" should read -- component --.

In column 3, line 51, "$R_aSi(ON=X)_{r-a}$" should read -- $R_aSi(ON=X)_{4-a}$ --.

In column 6, line 41 and column 7, line 10, "Substrata" should read -- Substrate --.

Signed and Sealed this

Twenty-sixth Day of March 1985

[SEAL]

Attest:

DONALD J. QUIGG

*Attesting Officer*    *Acting Commissioner of Patents and Trademarks*